(12) United States Patent
Egendorf

(10) Patent No.: US 7,962,383 B2
(45) Date of Patent: Jun. 14, 2011

(54) MEDIA ACCESS MONITORING SYSTEM AND METHOD

(76) Inventor: Harris H. Egendorf, Philadelphia, PA (US)

( * ) Notice: Subject to any disclaimer, the term of this patent is extended or adjusted under 35 U.S.C. 154(b) by 133 days.

(21) Appl. No.: 12/274,949

(22) Filed: Nov. 20, 2008

(65) Prior Publication Data

US 2009/0132398 A1  May 21, 2009

Related U.S. Application Data

(60) Provisional application No. 61/003,989, filed on Nov. 21, 2007.

(51) Int. Cl.
    *G07B 17/00* (2006.01)
(52) U.S. Cl. ............ 705/30; 340/309.16; 705/2; 705/25
(58) Field of Classification Search ............. 340/309.16; 705/5, 25, 30
    See application file for complete search history.

(56) References Cited

U.S. PATENT DOCUMENTS

| 4,475,222 A | 10/1984 | Egendorf | |
|---|---|---|---|
| 4,553,252 A | 11/1985 | Egendorf | |
| 4,990,756 A * | 2/1991 | Hoemann | 235/435 |
| 5,171,976 A * | 12/1992 | Bone, Jr. | 235/375 |
| 6,933,834 B2 * | 8/2005 | Diggins, Jr. | 340/309.16 |
| 7,085,727 B2 * | 8/2006 | VanOrman | 705/5 |
| 2002/0184122 A1 * | 12/2002 | Yamaguchi et al. | 705/30 |
| 2008/0103974 A1 * | 5/2008 | Fridhendler et al. | 705/52 |

OTHER PUBLICATIONS

Thompson, Maryann Jones, The technology Budget Creep, Mar. 2005, Technology Review, vol. 108, No. 3, p. 86.*
Japanese Ad Spending Down, Feb. 17, 2004, Jiji Press English News Service.*

* cited by examiner

*Primary Examiner* — Matthew S Gart
*Assistant Examiner* — Talia Crawley
(74) *Attorney, Agent, or Firm* — Maday Patent Law, PLLC; Jeffrey J. Maday

(57) ABSTRACT

Provided is a sealed cartridge for housing audio video media, the cartridge comprising an electrical counter displaying at least two different counting languages. The electrical counter configured to increment a count when the cartridge is in an audio video player device and the housed audio video media is accessed. An audio video media incorporating the electrical counter and a method of monitoring access to audio video media are also provided. Communication of usage counts over the Internet and processing payments to retailers, copyright holder and others are also provided.

23 Claims, 3 Drawing Sheets

MEDIA ACCESS MONITORING SYSTEM AND METHOD

CROSS-REFERENCE TO RELATED APPLICATIONS

This application claims the benefit of U.S. Provisional Patent Application Ser. No. 61/003,989, filed Nov. 21, 2007, the entire disclosure of which is hereby incorporated by reference.

BACKGROUND OF THE INVENTION

With the advent of video cassette recorders ("VCRs"), compact disks ("CDs"), digital versatile disks ("DVDs"), and other portable and convenient media for storing and transporting audio-video information, there has arisen a market for rental of movies and other products (hereinafter, collectively "AV products") for personal home viewing. Numerous retail rental stores offering AV products have appeared, as well as stand-alone rental kiosks and even rent-by-mail operations, providing the home viewer with numerous options for renting AV products.

Because portable media and the various portable media players generally available do not allow tracking of each use of a given individual AV product, it is difficult for AV product providers to actually determine how many times each AV product is viewed.

Also, unfortunately, with the advent of portable media, there has also arisen a market for "illegal" or "pirated" copies of AV products—copies produced and distributed in violation of the copyright laws of the United States or relevant jurisdiction(s). Thus, it is difficult for AV product providers or retail rental store operators to identify how many pirated copies are publicly circulating.

Piracy of AV products represents a significant loss to the organizations which create, market and sell AV products. Moreover, piracy leads to losses not only for these organizations, but for their employees, shareholders, actors, production persons, marketing, and even to the public treasury which suffer due to both lost revenue from lost legitimate sales and charge-offs by organizations whose sales are directly affected by the piracy.

U.S. Pat. No. 3,678,215 discloses a cassette for use with a VCR tape designed to facilitate rentals based on frequency of use. The cassette disclosed in the '215 patent is not a standard cassette and requires an opening in an end wall and a counter at the opposite end operated by levers and rods, etc. actuated by a specially designed member on the recorder chassis.

U.S. Pat. No. 4,475,222 discloses a VCR tape cassette with a use counter in which the use counter is incremented upon insertion or removal of the cassette into or out of the recorder.

U.S. Pat. No. 4,553,252 discloses a similar cartridge or cassette for holding a computer software CD.

One difficulty encountered with existing counters is that they are limited to being readable either by a machine, for example using a bar code, or by individuals, e.g., through the use of an alpha-numeric display.

It is thus desirable for an electrical counter to display and update in both a human-readable and a machine-readable format simultaneously.

It is also desirable to provide an electric timer for AV products to allow quick and accurate determination of an AV product's rental time to a rental outlet.

SUMMARY OF THE INVENTION

One aspect of the present invention provides a sealed cartridge for housing audio video media. The cartridge includes an electrical counter displaying at least two different counting languages. The electrical counter is configured to increment a count when the cartridge is in an audio video player device and the housed audio video media is accessed.

Another aspect of the invention includes the sealed cartridge described herein, in which the at least two different counting languages include a human readable alpha-numeric language and a machine readable language. In an embodiment of the invention, the machine readable language is a bar code, which is changed to match the alpha-numeric language display in value.

A further aspect of the present invention provides a timer in communication with the electrical counter. The timer and electrical counter are configured to allow only a single increment to the counter during a single rental period.

A further aspect of the present invention provides that the electrical counter includes a liquid crystal display.

A further aspect of the present invention provides that the electrical counter is incremented by mechanical, electrical or optical means.

Another aspect of the invention further includes a static bar label display provided on the cartridge. In an embodiment of the invention, the static bar label includes information regarding the audio video media, such as a title, a copy number, a rental outlet or a rental outlet assigned inventory number, or the like.

A further aspect of the present invention provides a sealed cartridge including a clear window allowing visualization of the actual audio video media.

Another aspect of the invention provides the sealed cartridge, as described above, further including a timer indicating the time since a user obtained the cartridge and audio video media contained within. In an embodiment of the invention, the timer is reset via a secure reset mechanism, and such a secure reset mechanism may be accessed via a pinhole or other mating means in the timer.

Another aspect of the present invention includes a method of monitoring access to audio video media. The method includes providing a sealed cartridge for housing the audio video media, wherein the cartridge comprises a counter having a display for displaying a count, initialized at zero, in at least two formats, one format being human readable alpha-numeric, and another format being machine readable, and incrementing the count each time the audio video media is in an appropriate audio video media player, and audio video content on the audio video media is played.

In another aspect of the invention, a timer is provided, initialized to zero at the time of rental of the audio video media, and used for counting the time before the audio video media is returned.

Another aspect of the invention provides an audio video media containing thereon audio video information. The audio video media includes an electrical counter displaying at least two different counting languages. The electrical counter is configured to increment a count when the audio video media is in an appropriate audio video player device and the audio video media information is accessed. In an embodiment of the present invention, the at least two different counting languages comprise a human readable alpha-numeric language and a machine readable language.

Another aspect of the invention provides a method for monitoring access to audio video media, the audio video media comprising identifying information. The method includes providing a sealed cartridge for housing the audio video media, wherein the cartridge comprises a counter having a display for displaying a count, initialized at zero, in at least two formats, one format being human readable alpha-numeric, and another format being machine readable, incrementing the count each time the audio video media is in an appropriate audio video media player and audio video content on the audio video media is played, and transmitting via an Internet connection a message to a data repository, the message comprising the audio video media information and the count. In various embodiments, the method further includes processing payment for the usage of the audio video media as indicated by the count.

DETAILED DESCRIPTION

"AV product" and "audio video media" are used here interchangeably and means any digital or analog audio video product, including but not limited to VHS videotape, compact disc (CD), digital versatile disk (DVD), Blu-Ray™ disk, without limitation.

The present invention advantageously provides for an electrical counter on a sealed cartridge or directly on an AV product to display and update in both a human-readable and a machine-readable format simultaneously.

The present invention also advantageously provides an electric timer for AV products to allow quick and accurate determination of an AV product's rental time to a rental outlet.

Figure 1:
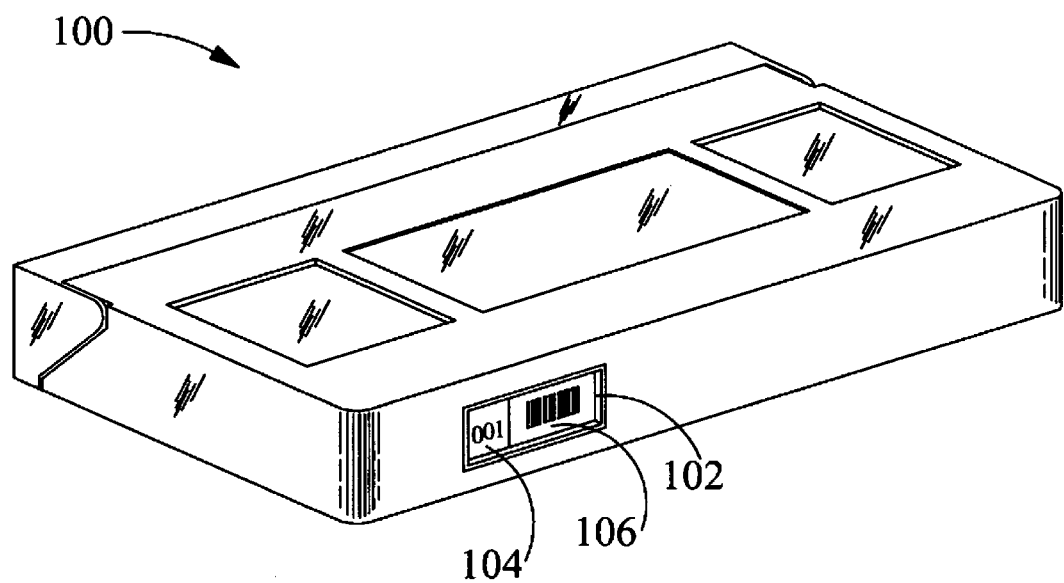
FIG. 1 is a perspective view of a VHS tape cartridge or cassette, in accordance with an embodiment of the present invention.

FIG. 1 illustrates an exemplary VHS cassette cartridge 100. In an embodiment of the invention, the cartridge 100 includes an electronic display 102. In a preferred embodiment, the electronic display is a liquid crystal display ("LCD"), although it is recognized that any suitable display having a low power requirement may be employed without altering the invention. The display is divided into two parts—an alpha-numeric human readable portion 104, and a machine readable portion 106. The machine readable portion may display a bar code, or other displayable and machine readable language.

Figure 2:
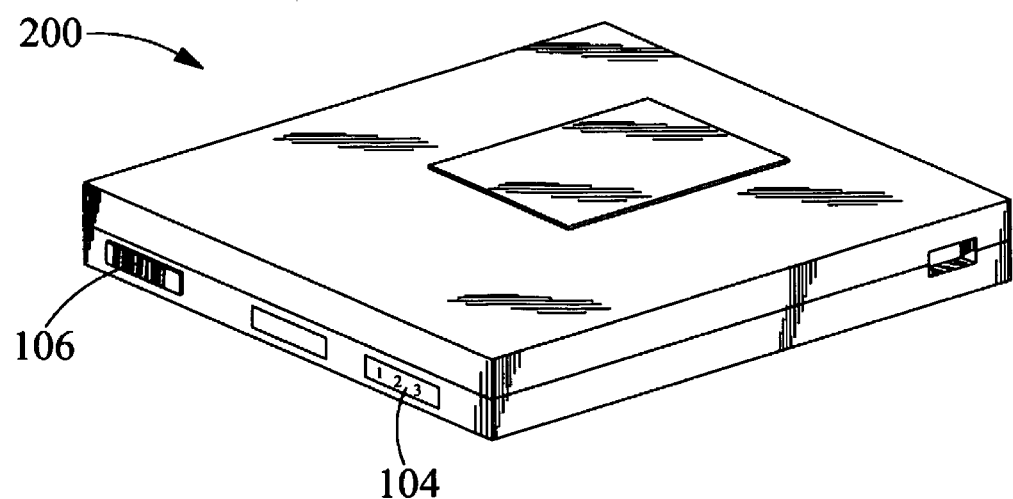
FIG. 2 is a perspective view of a CD, DVD or Blu-Ray™ cartridge, in accordance with an embodiment of the present invention.

FIG. 2 illustrates an exemplary CD, DVD or Blu-Ray™ cartridge 200. In an embodiment of the invention, just as with the VHS cassette cartridge 100, the cartridge 200 includes an alpha-numeric human readable display portion 104 and a machine readable display portion 106. In this cartridge 200, the alpha-numeric human readable display portion 104 machine readable display portion 106 are separated in two displays. In actual practice, the alpha-numeric human readable display portion 104 and machine readable display portion 106 may be together in one display or separated into two displays.

Figure 3:
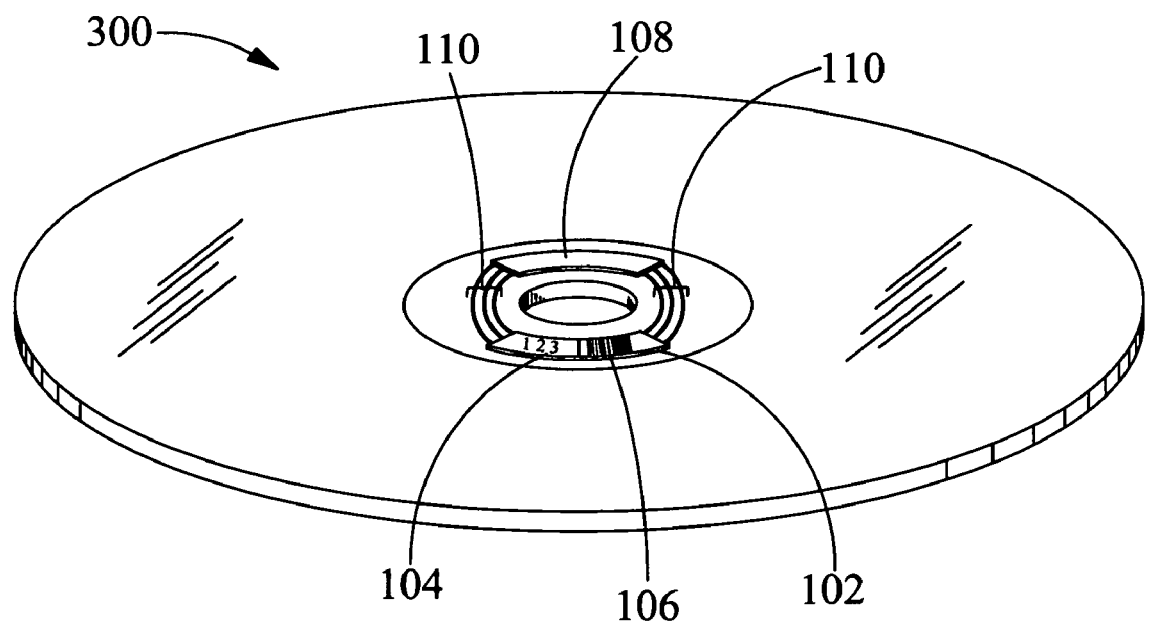
FIG. 3 is a perspective view of a CD DVD or Blu-Ray™ disk, in accordance with an embodiment of the present invention.

FIG. 3 illustrates a CD, DVD or Blu-Ray™ disk 300. In accordance with an embodiment of the present invention, the disk 300 includes a display 102 having an alpha-numeric human readable display portion 104 and a machine readable display portion 106. In an embodiment of the invention, power to and control of the display 102 is provided via communication leads 110 to a power/control unit 108. The power/control unit 108 is a miniaturized version of the electrical components in communication with the LCD(s) 104, 106 as described in FIG. 4.

Figure 4:
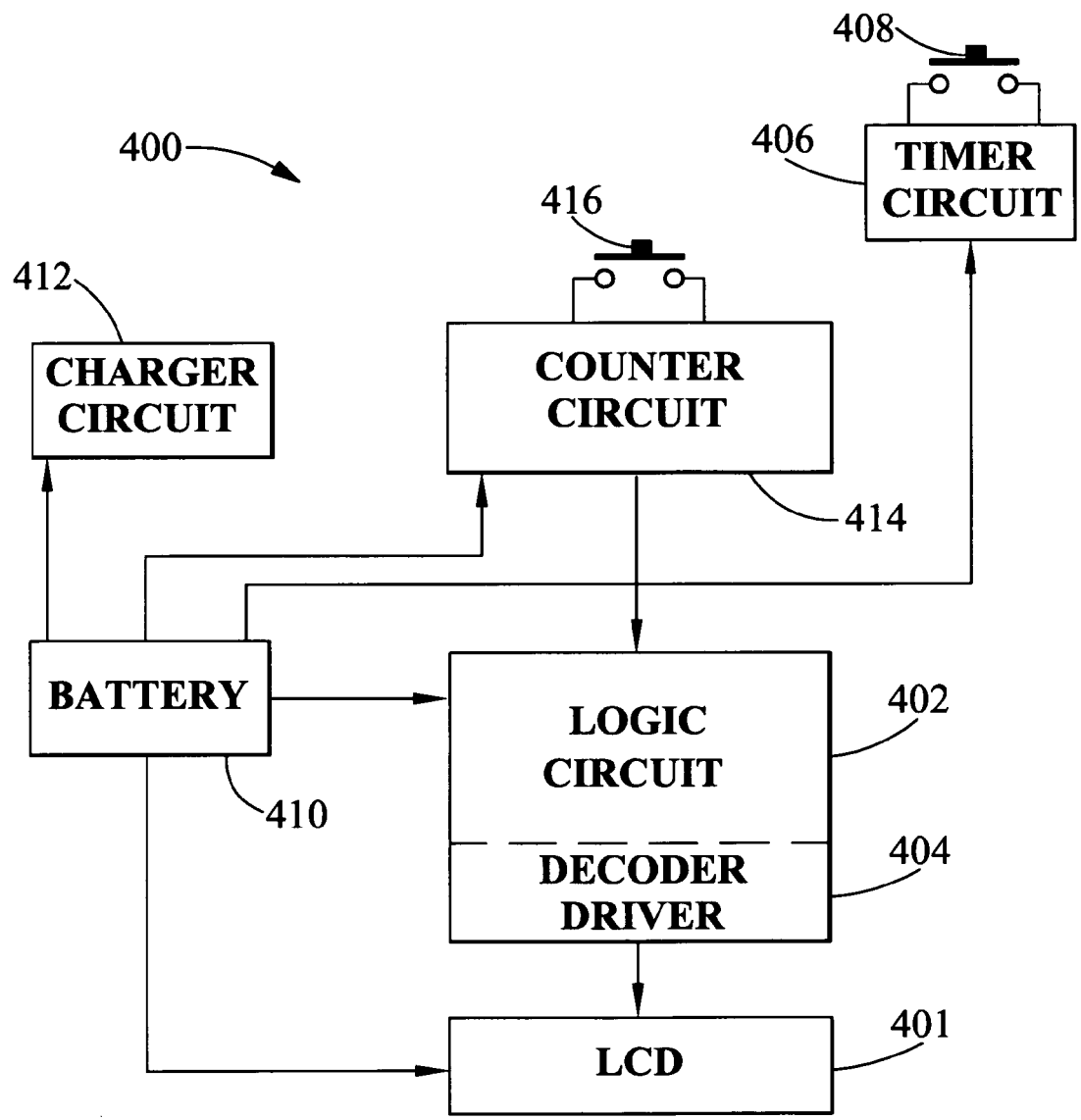
FIG. 4 is a schematic diagram of the electrical components of the electrical counter, in accordance with an embodiment of the present invention.

FIG. 4 describes the electrical components of an exemplary electrical counter 400. In accordance with an embodiment of the present invention, the electrical counter includes a logic circuit 402 including a decoder/driver 404, in operative communication with a display, such as the depicted LCD 401, a battery 410 and charging circuit 412, a count circuit 414 and count reset switch 416, and a timer 406 and timer reset switch 408. Although not depicted, a second LCD is similarly connected with the battery 410 and logic circuit 402 in embodiments using dual LCD displays.

In various embodiments of the invention, the electrical components are incorporated into the cassette cartridge 100, the disk cartridge 200, or in micro-miniaturized form directly onto the surface of a disk 300. In each of these embodiments, minor alterations are made for positioning the electronics in unused portions of the cartridge 100, 200, or, in a power/control unit 108, preferably in form of a microchip. In the later instance, count and timer reset switches 416, 408 are preferably controlled externally via an electrical, magnetic or optical signal.

The logic circuit 402 and decoder/driver 404 operate to control the display by acting over communication lines. The logic circuit is also intended to include inputs, not depicted, which serve to inform the logic circuit 402 of when to increment the count to be displayed. For example, in an embodiment, the player/reader device would signal to the logic circuit that the media is being accessed, by mechanical, electrical or optical means. In response, the logic circuit 402 then applies predetermined rules to the information regarding access, such as timer 406 input combined with an exemplary rule to only increment the display once in a 24-hour period, to determine if the display is to be incremented.

The display, such as the depicted LCD 401, may be of any common type convenient to the size and power constraints as required for use with the media.

Likewise, the battery 410 and charging circuit 412 may be of any type, and would preferably provide for usage over a long period of time relative to a typical rental duration. Also, use of a charging circuit 412 able to recharge the battery 410 when the media is in a reader/player, either through electromagnetic or photovoltaic means, is a desirable arrangement.

Also in a disk 300 embodiment, the battery may be replaced by an active radio-frequency driven power supply, with corresponding changes to other components to render the memory of any of the electronic components persistent.

Additional embodiments of the invention are envisioned in which the electronics are modified in size and power requirements to fit into space available on other cartridges or disks. For example, in an embodiment using a larger disk cartridge than depicted in the Figures herein, additional space my be used for a battery to provide a longer lifespan to the electronic counter.

The typical operation will now be described with reference to a DVD cartridge 200, although the general principles are applicable in other embodiments as well.

In a typical monitoring operation, a sealed cartridge 200 is provided for housing audio video media. The sealed cartridge 200 includes a counter having a display for displaying a count, initialized at zero, in two formats. The first format is human readable alpha-numeric 104, and the other format is a machine readable bar code 106. When the cartridge 200 containing the AV media is loaded into an appropriate audio video media player, and audio video content on the audio video media is played. In accordance with an embodiment of the invention, the alpha-numeric display 104 count is then incremented, and the bar code display 106 is updated to reflect the count.

In an embodiment of the invention, an accidental preventative count timer, not depicted, may be used to allow a predetermined amount of time to re-insert a cartridge without counting another rental, thereby preventing the user from having to pay for another rental. Also, other logic may be employed as desired to optimize the user's experience. For example, requiring that the AV media be accessed for at least some minimum amount of time before incrementing the counter would help protect a user who was interrupted at the beginning of the AV media from having to pay for an additional rental until at least a certain amount of time has elapsed.

In an embodiment of the invention, the cartridge 200 is used in a way that mimics the movie theater experience. For example, when the cartridge 200 is first inserted into the player and the media is accessed, the counter is incremented. Then, as long as the cartridge 200 is seated in the player, the counter is not incremented until a predetermined time period has expired. If the user removes the cartridge 200 and then reinserts it into the same player, the counter is optionally configured to either again increment the count upon the next media access, or not increment the count unless a predetermined amount of time has passed. Alternatively, if the second or later insertion of the cartridge 200 is into a different player, e.g., the user's neighbor, then the counter is configured to increment the counter upon media access. In order to operate in this fashion, the cartridge's logic circuit 402 would need to obtain information from the player, which may be done in numerous ways as understood by those of skill in the art. For example, the player may communicate a unique id code to the cartridge's logic circuit 402 via a communication sending means located in the player and a receiving means in communication with the logic circuit 402, both not depicted in the FIGURES.

Usage of the cartridge 200 of the present invention is not limited to counting each viewing, although this is envisioned as well. Additional usage envisioned includes allowing the counter to be read by a computer and payments to be processed by the computer over the Internet. For example, in a mail rental system, content may be ordered online from a rental provider by the user and the cartridge 200 sent to the user through the mail. In such an embodiment, the user may then watch the media on the cartridge 200 as desired, with the counter being incremented in accordance with previously determined criteria. After the user is finished with the cartridge 200, they may scan the bar code into a computer, which would then, in turn, forward it over the Internet to the rental provider, who then can charge the user the rental fee based on the actual viewing of the media on the cartridge 200. Moreover, in an embodiment of the invention, the user would then be able to print out a mailing label, optionally postage paid, for returning the cartridge 200.

In a further embodiment, a timer is initialized to zero at the time of rental of the audio video media. The timer then counts the time before the audio video media is returned.

In another embodiment of the invention, the cartridge 200, includes both a static bar label of title and copy number plus a second changing machine readable language, such as a bar label, revealing the amount of rental usage during a rental period. In an embodiment of the invention, the rental retailer's computer is programmed to automatically wire transfer payment from the rental retailer's bank source to the bank source of the media's copyright owner. Relay several divisions or portions of the payment/payments simultaneously to any of the other entities involved in or related to the programming by contract is also envisioned.

Such use of the Internet in an embodiment differs from standard credit card billing systems by it's usage of a software product on a disc or other format accessed by insertion and use, whereas other methods of Internet use for software payment are for a download or cable sent signal, which is equal to the purchasing of a product, not the usage of an item inserted into a machine.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A permanently sealed cartridge for housing audio video media, the cartridge insertable into an audio video media player and comprising an electrical counter permanently attached to said cartridge displaying at least a human readable alpha-numeric language and a machine readable language, the electrical counter configured to increment a count when the cartridge is in an audio video player device and the housed audio video media is accessed.

2. The sealed cartridge according to claim 1, further comprising a timer in communication with the electrical counter, the timer and electrical counter configured to allow only a single increment to the counter during a single rental period.

3. The sealed cartridge according to claim 1, further comprising a timer in communication with the electrical counter, the timer and electrical counter configured to increment the counter according to predetermined rental rules.

4. The sealed cartridge according to claim 1, wherein the machine readable language is a bar code.

5. The sealed cartridge according to claim 4, wherein the bar code changes to match the alpha-numeric language.

6. The sealed cartridge according to claim 1, wherein the electrical counter is incremented by mechanical, electrical or optical means.

7. The sealed cartridge according to claim 1, further comprising a static bar label display provided on the cartridge.

8. The sealed cartridge according to claim 7, wherein the static bar label comprises information regarding the audio video media.

9. The sealed cartridge according to claim 8, wherein the information includes any of a title, a copy number, a rental outlet or a rental outlet assigned inventory number.

10. The sealed cartridge according to claim 1, further comprising a clear window allowing visualization of the actual audio video media.

11. The sealed cartridge according to claim 1, further comprising a timer indicating the time since a user obtained the cartridge and audio video media contained within.

12. The sealed cartridge according to claim 11, wherein the timer is reset via a secure reset mechanism.

13. The sealed cartridge according to claim 12, wherein the secure reset mechanism is accessed via a pinhole in the timer.

14. A method for monitoring access to audio video media, the method comprising:

provided a permanently sealed cartridge for housing the audio video media, wherein the cartridge is insertable into an audio video media player and comprises a counter permanently attached to said cartridge having a display for displaying a count, initialized at zero, in at least two formats, one format being human readable alpha-numeric, and another format being machine readable;

incrementing the count each time the audio video media is in an appropriate audio video media player and audio video content on the audio video media is played;

transmitting via an Internet connection a message to a data repository, the message comprising the audio video media information and the count; and electronically transmitting payment to a copyright holder or other third party according to a predetermined payment schedule, wherein said payment is processed for usage of said audio video media as indicated by said count.

15. The method according to claim 14, wherein the display is a liquid crystal display.

16. The method according to claim 14, wherein the machine readable language is a barcode.

17. The method according to claim 14, further comprising:

providing a timer permanently attached to said cartridge, the timer initialized at zero at the time of rental of the audio video media, for counting the time before the audio video media is returned.

18. An audio video media containing thereon audio video information, the audio video media insertable into an audio video media player, and comprising an electrical counter permanently attached to said audio video media, the counter displaying at least a human readable alpha-numeric language and a machine readable language, the electrical counter configured to increment a count when the audio video media is in an appropriate audio video player device and the audio video media information is accessed.

19. The audio video media according to claim 18, wherein the machine readable language is a bar code.

20. The audio video media according to claim 18, where the electrical counter is incremented by mechanical, electrical or optical means.

21. The sealed cartridge according to claim 1, wherein said audio video media is chosen from the group: VHS cassette tape, audio CD and video DVD.

22. The audio video media of claim 18, wherein said audio video media is chosen from the group: audio CD and video DVD.

23. A method for monitoring access to audio video media, the method comprising:

providing an audio video media containing thereon audio video information, wherein the audio video media is insertable into an audio video media player and comprises a counter permanently attached to said audio video media, the counter having a display for displaying a count, initialized at zero, in at least two formats, one format being human readable alpha-numeric, and another format being machine readable;

incrementing the count each time the audio video media is in an appropriate audio video media player and audio video content on the audio video media is played;

transmitting via an Internet connection a message to a data repository, the message comprising the audio video media information and the count; and electronically transmitting payment to a copyright holder or other third party according to a predetermined payment schedule, said payment is processed for usage of said audio video media as indicated by said count.

* * * * *